L. P. C. J. JACQUET.
SHOCK ABSORBER.
APPLICATION FILED SEPT. 8, 1911.

1,040,948.

Patented Oct. 8, 1912.

Witnesses

Inventor:
L. P. C. J. Jacquet,
Attorneys.

UNITED STATES PATENT OFFICE.

LOUIS PAUL CONSTANT JULES JACQUET, OF NEUILLY-SUR-SEINE, FRANCE.

SHOCK-ABSORBER.

1,040,948.  Specification of Letters Patent.  Patented Oct. 8, 1912.

Application filed September 8, 1911. Serial No. 648,320.

*To all whom it may concern:*

Be it known that I, LOUIS PAUL CONSTANT JULES JACQUET, a citizen of the Republic of France, residing at Neuilly-sur-Seine, 5 Boulevard de la Seine, Seine, in the Republic of France, engineer, have invented certain new and useful Improvements in Shock-Absorbers, of which the following is a specification.

My invention relates to an improved shock absorber for spring-suspended vehicles, and it consists in the constructions, combinations and arrangements herein described and claimed.

An object of my invention is to provide an efficient and compact shock absorber adapted for convenient attachment to the existing types of spring-suspended vehicles.

Figure 1:
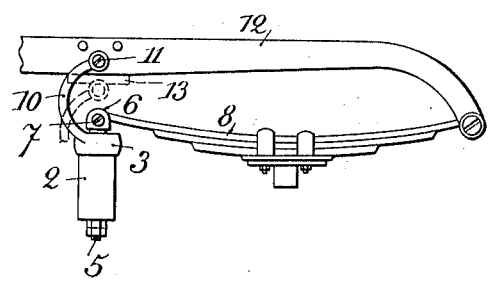
Figure 2:
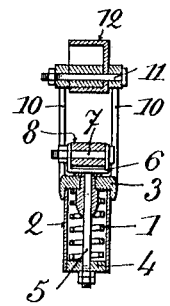
Figure 3:
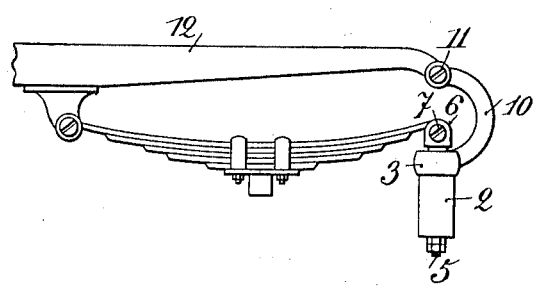

In the accompanying drawings, forming a part of this application, and in which similar reference symbols indicate corresponding parts in the several views:—Figure 1 is a fragmentary side elevation, illustrating one embodiment of my invention; Fig. 2 is an enlarged, vertical, axial section through the spring-containing cylinder shown in Fig. 1; Fig. 3 is a view similar to Fig. 1, illustrating a slight modification; and Fig. 4 is an end elevation of the construction shown in Fig. 3.

Referring especially to Figs. 1 and 2 of the drawings, 4 indicates a piston slidably mounted in a cylinder, or casing 2, and provided with a piston rod 5 extending through the upper head 3 of said cylinder; a spiral spring 1 being confined between said piston and cylinder head. The piston rod 5 carries at its upper end a forked head 6 for receiving one end of a usual laminated suspension spring 8, which latter is secured to said head by the usual shackle bolt 7. The cylinder head 3 is provided with curved arms 10 swingingly secured by a bolt or pivot 11 to the chassis member 12 axially of the cylinder 2 at a distance above the pivotal connection 7 of the vehicle suspension spring 8. In this construction shown in Figs. 1 and 2, the arms 10 are spaced apart to clear the laminated spring 8, and under certain conditions may be reversely curved to space them at opposite sides of said spring.

Figure 4:
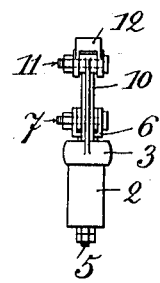

Figs. 3 and 4 illustrate a slight modification in which the forked head 6 of the piston rod is secured to the rear end of the laminated spring 8, and the cylinder head 3 is provided with a single rearwardly-curved arm 10 connected by a bolt 11 to the chassis member 12.

From the above description, it will be clear that the cushioning effect of the piston 4 in the cylinder 2 will augment the action of the spring 1 in preventing sudden and excessive shocks on the suspension spring 8.

I claim:—

In a shock absorber for spring-suspended vehicles, the combination of a vertical cylinder provided with an upper head, a piston therein provided with a piston rod extending through said upper head, a spiral spring confined between said cylinder head and piston, means for pivoting one end of the vehicle suspension spring directly to said piston rod, and means for pivotally supporting said cylinder head from the vehicle chassis in the axial line of said cylinder at a distance above said pivotal connection of the suspension spring.

In testimony, that I claim the foregoing as my invention, I have signed my name in presence of two subscribing witnesses.

LOUIS PAUL CONSTANT JULES JACQUET.

Witnesses:
 H. C. COXE,
 MAURICE ROUX.

Copies of this patent may be obtained for five cents each, by addressing the "Commissioner of Patents, Washington, D. C."